US008577370B1

(12) United States Patent
Mann et al.

(10) Patent No.: US 8,577,370 B1
(45) Date of Patent: Nov. 5, 2013

(54) PERFORMING HANDOFF OF A MOBILE STATION BETWEEN DIFFERENT TYPES OF WIRELESS NETWORK CONTROLLERS

(75) Inventors: Karl D. Mann, Nepean (CA); Michael Pate, Ottawa (CA); Vijay Kesavarapu, Plano, TX (US); Sandra L. Foster, Garland, TX (US); Azeem Ahmad, Allen, TX (US); Henry Lee, Ottawa (CA); Jiangbin Yang, Ottawa (CA); Eric W. Parsons, Stittsville (CA)

(73) Assignee: Apple Inc., Cupertino, CA (US)

( * ) Notice: Subject to any disclaimer, the term of this patent is extended or adjusted under 35 U.S.C. 154(b) by 1169 days.

(21) Appl. No.: 12/028,511

(22) Filed: Feb. 8, 2008

Related U.S. Application Data (60) Provisional application No. 60/888,958, filed on Feb. 9, 2007.

(51) Int. Cl.
*H04W 36/00* (2009.01)
*H04W 24/00* (2009.01)
*H04W 4/00* (2009.01)
*H04M 1/00* (2006.01)

(52) U.S. Cl.
USPC ........ 455/436; 455/438; 455/439; 455/456.1; 455/552.1; 455/553.1; 370/331; 370/332; 370/333

(58) Field of Classification Search
USPC ................. 455/436–453, 456.1, 552.1, 553.1
See application file for complete search history.

(56) References Cited

U.S. PATENT DOCUMENTS

| | | | | |
|---|---|---|---|---|
| 6,101,175 A | * | 8/2000 | Schorman et al. | 370/331 |
| 6,836,471 B2 | * | 12/2004 | Holma et al. | 370/331 |
| 7,072,656 B2 | * | 7/2006 | Willars et al. | 455/436 |
| 7,590,092 B2 | * | 9/2009 | Milton et al. | 370/331 |
| 7,733,831 B2 | * | 6/2010 | Samuel et al. | 370/335 |
| 7,912,009 B2 | * | 3/2011 | Sayeedi et al. | 370/331 |
| 2009/0176479 A1 | * | 7/2009 | Vikberg et al. | 455/406 |

OTHER PUBLICATIONS

Foster et al., 3rd Generation Partnership Project 2 "3GPP2", A.S0008-C, v.2.0, "A21 Radio Update Procedure" dated Jan. 29, 2008 (19 pages).
3rd Generation Partnership Project 2, 3GPP TS 23.216, v.0.1.0 (Jan. 2008), "Single Radio Voice Call Continuity (SRVCC)" (12 pages).
3rd Generation Partnership Project 2, 3GPP, UTRA-UTRAN Long Term Evolution (LTE) and 3GPP System Architecture Evolution (SAE) dated on or before Dec. 16, 2007 (8 pages).

(Continued)

Primary Examiner — Wesley Kim
(74) Attorney, Agent, or Firm — Meyertons, Hood, Kivlin, Kowert & Goetzel, P.C.

(57) ABSTRACT

To perform handoff of a mobile station from a source wireless network controller of one wireless access technology to a target wireless network controller of a different wireless access technology, a first message for initiating a handoff is sent from the source wireless network controller to the target wireless network controller. The source wireless network controller receives, from the target wireless network controller, a second message responsive to the first message, where the second message contains information to enable identification of cell segments neighboring the target wireless network controller for which signal strength measurements are to be performed. In response to the second message, signal strength measurements made by the mobile station are received by the target wireless network controller.

15 Claims, 6 Drawing Sheets

(56) References Cited

OTHER PUBLICATIONS

3rd Generation Partnership Project 2, 3GPP TS 23.401, v8.0.0 (Dec. 2007), "General Packet Radio Service (GPRS) enhancements for Evolved Universal Terrestrial Radio Access Network (E-UTRAN) Access", Release 8 (167 pages).

3rd Generation Partnership Project 2, 3GPP TS 23.060, v7.6.0 (Dec. 2007), "General Packet Radio Service (GPRS) Service Description Stage 2", Release 7 (217 pages).

3rd Generation Partnership Project 2, 3GPP TS 23.402, v1.4.0 (Oct. 2007), "Architecture Enhancements for Non-3GPP Accesses", Release 8 (125 pages).

* cited by examiner

PERFORMING HANDOFF OF A MOBILE STATION BETWEEN DIFFERENT TYPES OF WIRELESS NETWORK CONTROLLERS

CROSS-REFERENCE TO RELATED APPLICATIONS

This application claims the benefit under 35 U.S.C. §119 (e) of U.S. Provisional Application Ser. No. 60/888,958, entitled "Target System Assisted Method to Perform Hard Handoff Between 1xEV-DO and 1xRTT Wireless Networks," filed Feb. 9, 2007, which is hereby incorporated by reference.

TECHNICAL FIELD

The invention relates to performing handoff of a mobile station between different types of wireless network controllers.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies. The CDMA 2000 family of wireless access technologies include the 1xRTT wireless access technology (generally used to perform circuit-switched communications), and the 1xEV-DO (or EV-DO) wireless access technology (used for communication of packet data and defined by the High Rate Packet Data (HRPD) specification, also known as the IS-856 specification).

More recently, further development of the 3GPP standards have lead to the 3GPP LTE (long term evolution) wireless access technology.

Within a mobile communications network, different types of wireless access equipment corresponding to different types of wireless access technologies may be present. For example, a wireless communications network may include both 1xRTT and 1xEV-DO wireless access equipment. As a mobile station moves within such a mobile communications network, the mobile station may be handed off from 1xEV-DO wireless access equipment to 1xRTT wireless access equipment (or vice versa).

Conventionally, a handoff (or handover) that is performed between different types of wireless access equipment, such as between 1xEV-DO and 1xRTT wireless access equipment, may be associated with various inefficiencies. For example, one of the tasks performed during a handoff from 1 xEV-DO wireless access equipment to 1xRTT wireless access equipment is that the mobile station that is being handed off performs various pilot strength measurements that are communicated from the 1xEV-DO wireless access equipment to the 1xRTT wireless access equipment.

However, there may be a timing issue associated with the pilot strength measurements made by the mobile station, since the pilot strength measurements may have been made some relatively long period of time prior to completion of the handoff. As a result, the pilot strength measurements taken by the mobile station may no longer be accurate. Inaccurate pilot strength measurements may lead to improper allocation of radio resources in the target 1xRTT wireless network, or alternatively, the mobile station may be asked to repeat pilot strength measurements, which is inefficient.

SUMMARY OF THE INVENTION

In general, according to preferred embodiments of the invention, a method is provided to perform handoff of a mobile station from a source wireless network controller to a target wireless network controller, where the source and target wireless network controllers are different types of wireless network controllers. As part of the handoff procedure, the target wireless network controller sends a message to the source wireless network controller, where the message contains information to enable identification of cell segments neighboring the target wireless network controller for which signal strength measurements are to be performed.

Other or alternative features will become apparent from the following description, from the drawings, and from the claims.

DETAILED DESCRIPTION OF PREFERRED EMBODIMENTS OF THE INVENTION

In the following description, numerous details are set forth to provide an understanding of preferred embodiments of the invention. However, it will be understood by those skilled in the art that some embodiments of the invention may be practiced without these details and that numerous variations or modifications from the described embodiments may be possible.

In general, according to preferred embodiments, a technique or mechanism is provided to enable efficient handoff (or handover) of a mobile station between different types of wireless network controllers. The different types of wireless network controllers communicate with the mobile stations according to different wireless access protocols. For example, the different types of wireless network controllers can include a 1xEV-DO (or EV-DO) wireless network controller and a 1xRTT wireless network controller. The EV-DO and 1xRTT wireless access protocols are defined by various CDMA (code division multiple access) 2000 standards, with 1xRTT generally used for circuit-switched communications and EV-DO generally used for relatively high-speed packet data communications. EV-DO is defined by the High Rate Packet Data (HRPD) specification, also known as the IS-856 specification In other example embodiments, the different types of wireless network controllers can include a UMTS (Universal Mobile Telecommunications System) or an LTE (long term evolution) wireless network controller and a 1xRTT or EV-DO wireless network controller. LTE, which is enhancement of UMTS, is described in 3GPP TS 23.401 and 23.402.

Alternatively, handoff of a mobile station can be performed between a femtocell wireless network controller and another type of wireless network controller (such as a 1xRTT or EV-DO wireless network controller). A femtocell wireless network controller refers to a wireless network controller that is designed for use in residential or small business environments. When a user leaves the residential or small business environment, then the mobile station of the user would be handed off from the femtocell wireless network controller to a public wireless network controller, such as any one of the wireless network controllers listed above. Note that a femtocell wireless network controller can use 1xRTT, EV-DO, or other wireless access technology.

In other embodiments, handoffs between other combinations of wireless network controllers that utilize techniques according to preferred embodiments can be performed.

For enhanced efficiency, when performing a handoff of a mobile station between different types of wireless network controllers according to preferred embodiments of the invention, a target wireless network controller (the wireless network controller to which the mobile station is to be handed off) is able to send a message to the source wireless network controller (the wireless network controller that is serving the mobile station prior to the handoff), where the message contains information to enable identification of cell segments that neighbor the target wireless network controller. The identification of the cell segments neighboring the target wireless network controller enables the mobile station to specifically perform measurements of the signal strength of signals, such as pilot signals or other control signals, in the identified cell segments.

Note that a "cell segment" can refer to either a cell or cell sector. A "pilot signal" or "pilot" refers to a signal (e.g., predefined channel in a TDMA or CDMA system) that is used by a mobile station to acquire the wireless system and to assist in the process of handoffs, synchronization, and so forth.

The information enabling identification of cell segments refers to any one of the following: identifiers of cell segments, location information (e.g., timing offset) that enables a mobile station to find control signals (such as pilot signals) in corresponding cell segments, and so forth.

The message containing the information to enable identification of cell segments neighboring the target wireless network controller is sent by the target wireless network controller in a timely manner to the source wireless network controller such that control signal strength measurements made by the mobile station that is being handed off are made relatively close in time to when the handoff will be completed such that allocation of radio resources at the target wireless access system is based on recent control signal strength measurements. Note that according to preferred embodiments, it is the target wireless network controller that determines (selects) when a request of control signal strength measurements is to be made, and which neighboring cell segments the control signal strength measurements are to be made in. Also, by performing timely control signal strength measurements, efficiency is enhanced since the likelihood of the mobile station being requested to again make the control signal strength measurements is reduced. Also, reliability of handoffs is enhanced.

Note that the handoffs performed according to some example implementations are hard handoffs between the different types of wireless network controllers. The hard handoff can be a live handoff, where resources in the target wireless network are set up prior to the handoff occurring.

In the various examples discussed below, reference is made to measuring signal strengths of pilot signals in corresponding cell segments. Note that the techniques discussed can also be applicable to enable signal strength measurements of other types of control signals in response to information identifying cell segments sent by the target wireless network controller.

Figure 1:
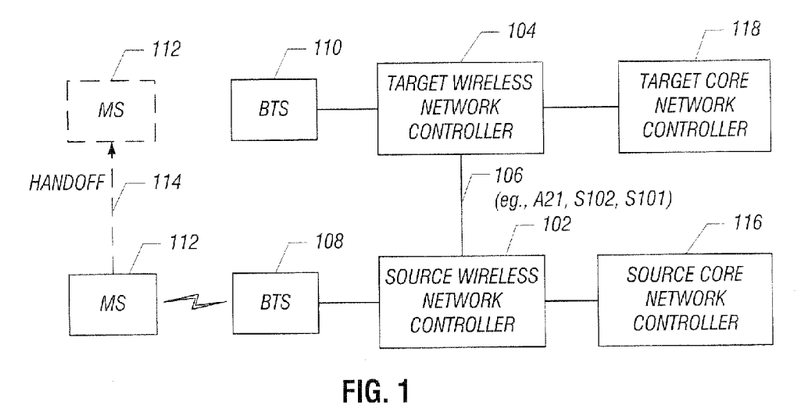
FIG. 1 is a block diagram of a communications network that includes different types of wireless access networks, in which a handoff mechanism according to preferred embodiments of the invention can be incorporated.

FIG. 1 illustrates an example wireless communications network that includes different types of wireless network controllers, including a source wireless network controller 102 of a first type, and a target wireless network controller 104 of a second, different type. Wireless network controllers of different "types" refer to wireless network controllers that perform communications with a mobile station using different protocols. For example, the source wireless network controller 102 can be a radio network controller (RNC) of a EV-DO wireless network, and the target wireless network controller 104 can be an interworking system (IWS) node of a 1xRTT wireless network, where the IWS node is used to implement A21 messaging over an A21 interface between the 1xRTT system and the EV-DO system. In some implementations, the IWS node can be part of a base station controller (BSC) in the 1xRTT wireless network. Alternatively, the IWS node can be separate from the BSC. The A21 interface defines various signaling messages to enable communication between a 1xRTT node and a EV-DO node (such as between the IWS node in the 1xRTT domain and the RNC in the EV-DO domain). A version of the A21 interface is defined by 3GPP2 A.S0008-C In other implementations, the source wireless network controller 102 can be an LTE wireless network controller (referred to as a mobility management entity or MME), which performs various functions including handoff control. In the implementation where the source wireless network controller 102 is an LTE wireless network controller (e.g., MME), then the target wireless network controller 104 can be a 1xRTT IWS node or a EV-DO RNC. As yet another alternative, the source wireless network controller 102 can be a femtocell wireless network controller, while the target wireless network controller 104 can be a 1xRTT or EV-DO wireless network controller, as examples.

Note that many other combinations of different types of wireless network controllers are also possible in other implementations. Generally, a "wireless network controller" refers to any node in a wireless communications network that is responsible for assigning wireless network resources.

Each of the source and target wireless network controllers 102 and 104 are connected to corresponding base transceiver stations (BTS) 108 and 110. In the LTE context, a BTS is part of a node referred to as "node B." The BTS 108 communicates over a wireless link with a mobile station 112. As indicated by dashed arrow 114, the mobile station 112 can be handed over from a source wireless network (source domain) including the source wireless network controller 102 and BTS 108 to a target wireless network (target domain) including the target wireless network controller 104 and BTS 110.

The source domain also includes a source core network controller 116 that is connected to the source wireless network controller 102. Depending on the particular implementation, the source core network controller 116 can be any one of the following controllers: an EV-DO serving gateway, an LTE serving gateway, and so forth. In the target domain, a target core network controller 118 is connected to the target wireless network controller 104, where the target core network controller 118 can be any one of the following controllers: a mobile switching center (MSC) in the 1xRTT context; a serving gateway in the EV-DO context, and so forth.

Figure 2:
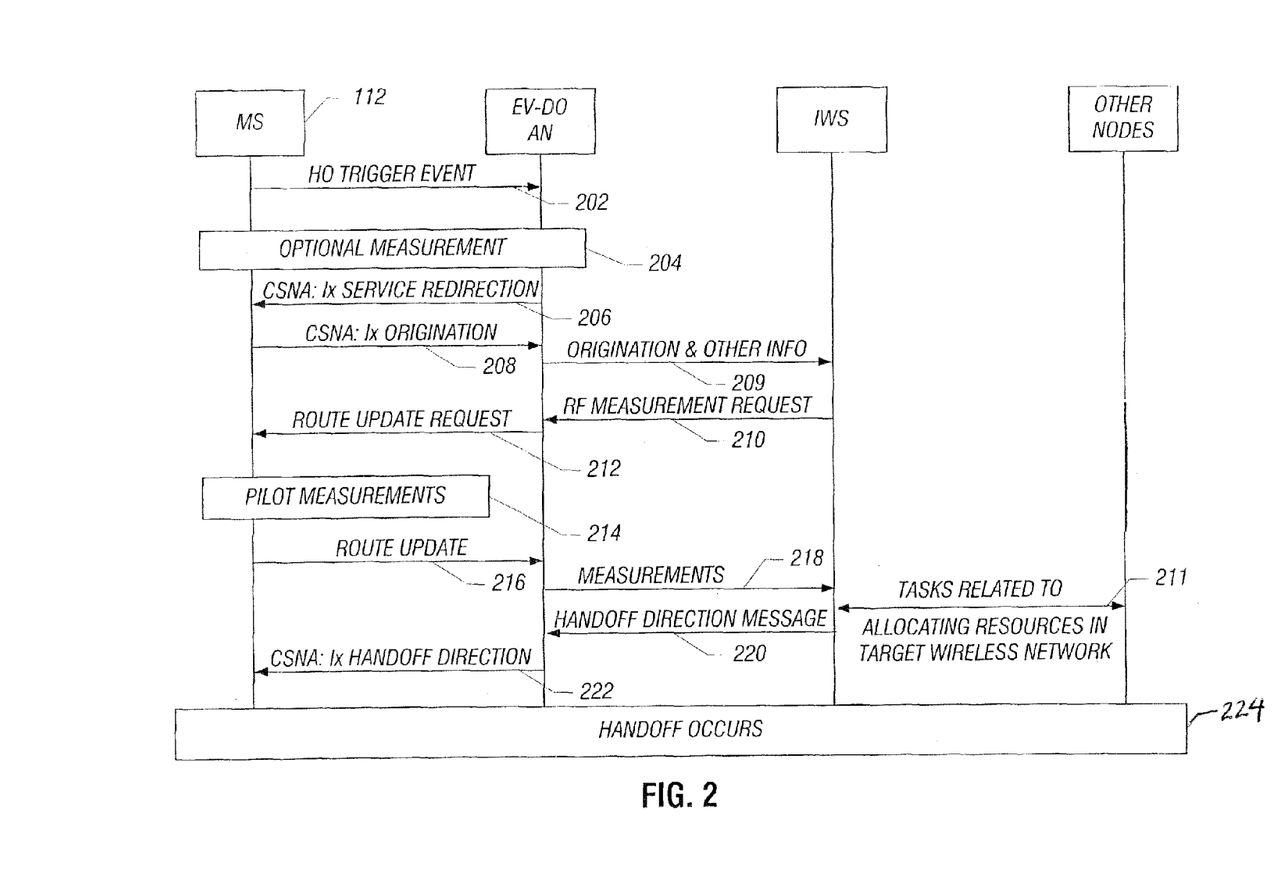
FIG. 2 is a message flow diagram of a handoff procedure from an EV-DO wireless network to a 1xRTT wireless network, according to a preferred embodiment of the invention.

FIG. 2 shows an example call flow procedure for performing a handover according to an embodiment. It is assumed that a bearer traffic path of a call flow (e.g., voice-over-IP call session, data session, etc.) has been established between the mobile station 112 with another endpoint through the EV-DO wireless network. The other endpoint can be another mobile station or a node connected to a fixed network.

At some point, a handoff trigger event 202 occurs, where the trigger event can be based on detecting that a pilot signal strength has fallen below a threshold, a roundtrip delay between the mobile station 112 and the EV-DO access network (radio network controller) exceeds some predefined amount, and so forth. Note that the EV-DO access network can make the determination that handoff is to be performed in response to information provided by the mobile station 112 at 202. In making the determination that handoff is to be performed, the EV-DO access network can determine that the radio environment within the 1xRTT wireless access network is preferable for supporting communication with the mobile station 112. At this point, the EV-DO access network can optionally initiate pilot strength measurements (at 204) at the mobile station 112 by sending a request, such as a Route Update Request message, to the mobile station 112 to perform measurements of strengths of pilot signals. The pilot signals that are measured include all pilot signals that the EV-DO access network is aware of. Once the pilot strength measurements have been performed, the mobile station 112 is able to send back the pilot measurements to the EV-DO access network. Note that the pilot measurements performed at 204 can be omitted in some implementations.

Next, the EV-DO access network sends (at 206) a 1x Service Redirection Message to the mobile station 112 using the CSNA (Circuit Services Notification Application) protocol, for example. The CSNA protocol is used to encapsulate 1xRTT messages for communication between an EV-DO access network and a mobile station. The 1x Service Redirection Message is interpreted by the mobile station 112 as an indication that the mobile station should begin a procedure to move the active call to the 1xRTT wireless network. Such procedure involves originating a call in the 1xRTT wireless network by sending 1xRTT signaling via the EV-DO access network using CSNA.

In response to the 1x Service Redirection Message sent at 206, the mobile station 112 responds with a 1x Origination Message (at 208) to the EV-DO access network, using CSNA to encapsulate the 1x Origination Message. The EV-DO access network then encapsulates the 1x Origination Message into an A21 message, such as an A21-1x Air Interface Signaling message that is sent (at 209) to an IWS node in the 1xRTT wireless network. Note that other information, in addition to the Origination Message, can be included in the message sent (at 209) from the EV-DO access network to the IWS node in the 1xRTT network. Such other information includes the measured strength of the EV-DO pilot, and optionally, pilot strength measurements of neighboring 1xRTT cell segments (if the EV-DO access network has such pilot strength measurements).

In accordance with preferred embodiments, the IWS node then sends (at 210) an RF measurement request to the EV-DO access network. In one example, the RF measurement request can be sent by the IWS node in response to receiving the A21-1x Air Interface Signaling message (at 209) that contains information for just the EV-DO pilot but not for 1xRTT pilots. This will force the IWS node to generate a list of 1xRTT pilots to measure. Alternatively, in other examples, the IWS node can send the RF measurement request at 210 in response to other trigger(s).

In another implementation, even if the EV-DO access network does send (at 209) information relating to 1xRTT pilots, the IWS node will nevertheless send the RF measurement request with information relating to a specific list of 1xRTT pilots, which may or may not be different from the 1xRTT pilots maintained by the EV-DO access network. In this implementation, the EV-DO access network can then request the mobile station to perform measurements for new or stale pilots in the list.

In preferred example embodiments, the RF measurement request can be sent in an A21-Radio Update Request message from the IWS node to the EV-DO access network. As discussed further below, the RF measurement request, which can be in the A21-Radio Update Request, includes information elements that contain information to enable a determination of which 1xRTT pilots the mobile station 112 should measure.

In response to the RF measurement request sent at 210, the EV-DO access network can send (at 212) a Route Update Request message that contains a request for 1xRTT pilot measurements. The pilots identified in the Route Update Request message are based on the information contained in the RF measurement request sent at 210.

In response, the mobile station 112 performs the requested pilot measurements (at 214), which include measurements of pilots of respective cell segments selected by the target 1xRTT IWS node. The mobile station 112 then responds (at 216) with a Route Update response message that contains the requested 1xRTT pilot measurements. These measurements are then forwarded by the EV-DO access network (at 218) to the IWS node, where the measurements can be sent in a A21-Radio Update Response message in preferred example embodiments.

Note that various tasks and communications (211) are also occurring between the IWS node and other nodes in the 1xRTT wireless network to allocate resources in the target wireless network to enable the handoff. Although shown as occurring late in FIG. 2, note that the tasks and communications (211) are actually occurring throughout between 209 and 220.

Next, the IWS node creates a 1xRTT handoff direction message and encapsulates the handoff direction message in an A2'-1x Air Interface Signaling message that is sent (at 220) to the EV-DO access network. The EV-DO access network delivers (at 222) the 1xRTT handoff direction message to the mobile station 112 in a CSNA encapsulated message. At this point, the handover can occur (at 224).

As noted above, the RF measurement request (210) can be submitted in an A21-Radio Update Request. In accordance with preferred example embodiments, the A21-Radio Update Request includes, among other elements, a Pilot List information element that includes information to enable identification of specific pilots (associated with corresponding 1xRTT cell segments) for which the mobile station 112 is to perform pilot strength measurements.

The A21-Radio Update Request can include one or more of the following information elements: Correlation ID to correlate the request to some call session: a Mobile Identity (MN ID) information element to identify the mobile station 112; and the Pilot List information element. The Pilot List information element includes a Length field to indicate the length of the Pilot List information element, and a Number of Pilots field to indicate the number of pilots that are identified in the Pilot List information element. The information for each pilot identified by the Pilot List information element includes one or more of the following: a timing offset to enable the mobile station 112 to compute the pilot of the respective cell segment that the mobile station is to measure; an identifier of the cell segment; or some other information that enables the mobile station 112 to identify which pilot the mobile station is to measure.

As noted above, the measurements that can be sent from the EV-DO access network to the IWS node (at 218) can be provided in an A21-Radio Update Response, which can also include a Pilot List information element (among other elements), where the Pilot List information element can include a list of measurements for corresponding pilots identified by the RF measurement request sent at 210.

FIG. 2 describes the messages exchanged among nodes in the context of an

Figure 3:
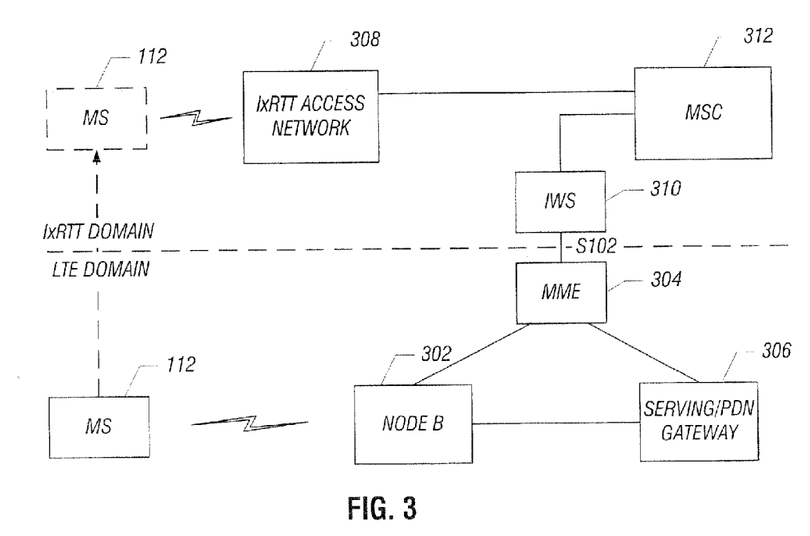
FIG. 3 is a block diagram of a communications network that includes nodes in a long term evolution (LTE) wireless network and a 1xRTT wireless network, in which a handoff mechanism according to a preferred embodiment of the invention can be incorporated.

EV-DO to 1xR'TT handoff. As another example, FIG. 3 shows network nodes that would be involved in an LTE to 1xRTT handoff of the mobile station 112. Originally, the mobile station 112 is in the LTE domain and has an established bearer path through node B 302 (which is the BTS in the LTE domain) and other nodes of the LTE domain with a remote endpoint. A node B in the LTE context is an enhanced node B, in that it includes functionality in addition to functionality of a node B used in a traditional UMTS wireless network. The enhanced node B performs radio resource management, selection of MME at mobile station attachment, routing of traffic towards the serving/PDN gateway, and other tasks.

The node B 302 is connected to an MME 304 and a serving and/or packet data network (PDN) gateway 306. The serving/PDN gateway 306 terminates the user plane interface towards node B 302 and assumes the responsibility for packet routing and transfer towards an external network (not shown in FIG. 3). Further details regarding the enhanced node B, MME, and serving/PDN gateway are provided in 3GPP TS 36.300.

The 1xRTT domain includes a 1xRTT access network 308 that includes a BTS and a BSC. The 1xRTT domain also includes an IWS node 310. The 1xRTT access network 308 and IWS node 310 are connected to an MSC 312. The interface between the MME 304 and the IWS 310 is referred to as a "S102 reference point," which is used to carry 1xRTT circuit-switched signaling messages between the MME 304 and the IWS node 310.

Note that the 1xRTT signaling messages are actually exchanged between the mobile station and the IWS node 310, and that the S102 reference point is just one link in the overall mobile station to IWS node tunneling path. This tunneling path includes a first tunnel between the mobile station 112 and node B 302, a second tunnel between node B 302 and MME 304, and the S102 tunnel between the MME 304 and the IWS node 310.

When comparing FIG. 3 to FIG. 1, node B 302 corresponds to BTS 108, the BTS in the 1xRTT access network 308 corresponds to the BTS 110, the MME 304 corresponds to the source wireless network controller 102, the IWS node 310 corresponds to the target wireless network controller 104, the serving/PDN gateway 306 corresponds to the source core network controller 116, and the MSC 312 corresponds to the target core network controller 118.

Figure 4:
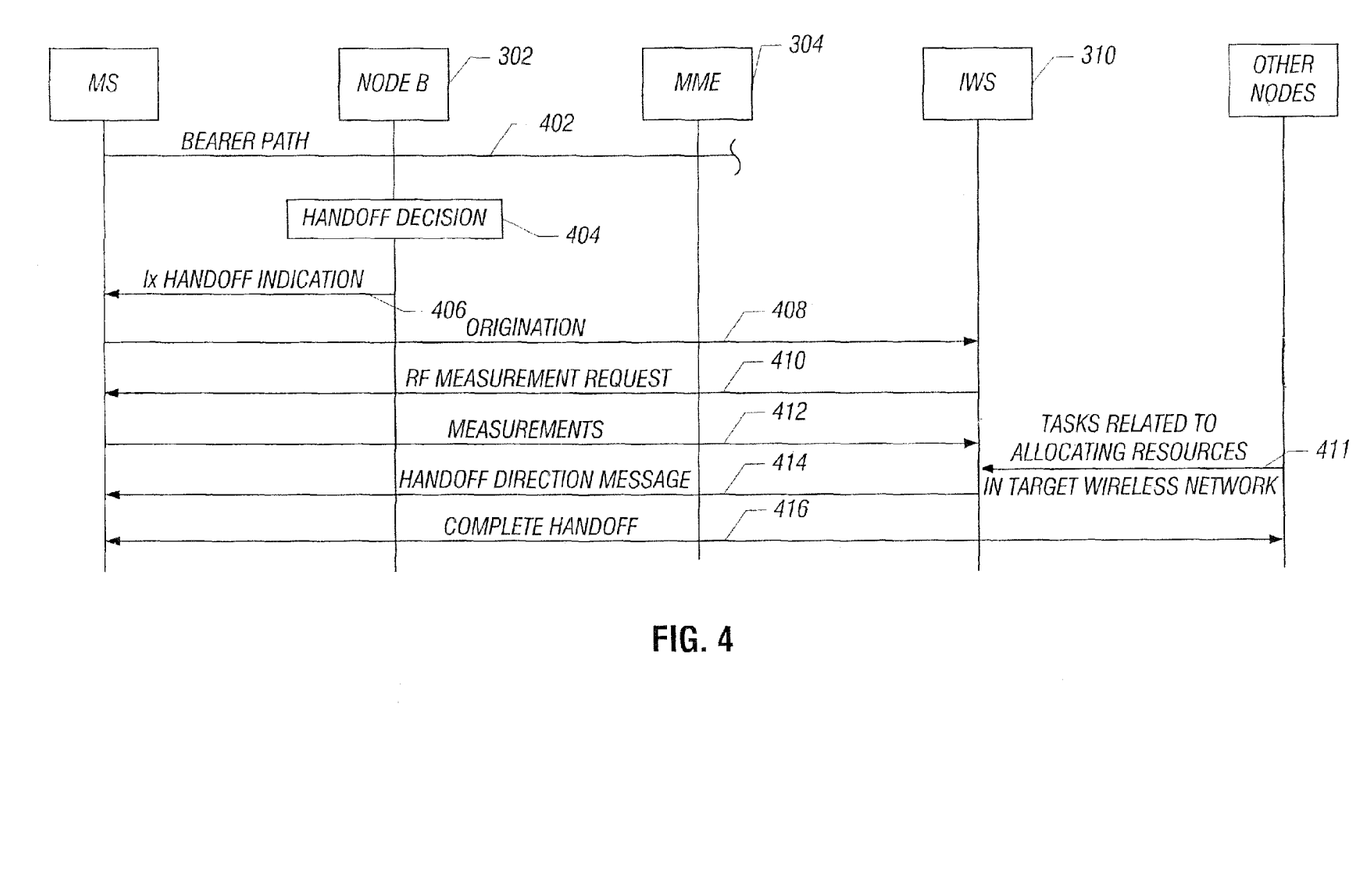
FIG. 4 is a message flow diagram of a handoff procedure from an LTE wireless network to a 1xRTT wireless network, according to a preferred embodiment of the invention.

FIG. 4 illustrates a message flow diagram to perform handoff from the LTE domain to the 1xRTT domain. An ongoing bearer path (402) is established between the mobile station 112 and another remote endpoint through the MME 304 through the node B 302. At some point, node B 302 makes a handoff decision (404), which involves handing off the mobile station 112 to the 1xRTT domain. In response, node B 302 signals (at 406) the mobile station 112 to perform the inter-technology handoff, where the signaling is performed using a 1xRTT relocation indication that is encapsulated in a tunneling message between node B 302 and the mobile station 112.

In response, the mobile station 112 sends an origination request (at 408) to the IWS node 310. Note that the origination request actually passes through the node B 302 and the MME 304 to the IWS node 310. In some implementations, messages exchanged between the mobile station 112 and the IWS node 310 are simply relayed through the node B 302 and MME 304 (with corresponding encapsulations performed for the different tunnels in the path). In other implementations, a message sent from the mobile station 112 is converted to a different message by the node B 302 before communication through the MME to the IWS node, and similarly, a message sent by the IWS node is converted to a different message by the node B 302 before communication to the mobile station 112.

If the IWS node 310 determines that selective measurements of target 1xRTT pilots is to be performed, then the IWS node generates an RF measurement request, which can be in the form of an A21-Radio Update Request message (similar to that for the flow of FIG. 2) that is sent (at 410) from the IWS node to the MME 304 in the LTE domain. The MME forwards the RF measurement request to node B 302. In a first implementation, the RF measurement request is forwarded by the node B 302 to the mobile station 112 (with appropriate encapsulation for the tunnel between node B 302 and the mobile station 112). In a second implementation, the RF measurement request received by the node B 302 is translated to another message that is communicated to the mobile station 112. In either case, some messaging is provided to the mobile station 112 that enables identification of selected cell segments (pilots) for which the mobile station 112 is to perform pilot strength measurements.

In response to the request to measure pilots, pilot strength measurements taken by the mobile station 112 are communicated (at 412) back in a response message to the IWS node 310. Again, in a first implementation, the node B 302 forwards the response message containing the pilot measurements (with corresponding encapsulations for the respective tunnels) through the MME 304 back to the IWS node 310. In a second implementation, the node B 302 translates the response message containing the measurements into a different message before sending through the MME 304 to the IWS node 310. The measurements can be sent back to the IWS node 310 in an A21-Radio Update Response.

Also, other tasks and messages (411) are occurring with other nodes to allocate resources in the target wireless network to perform the handoff. Next, a handoff direction message is then sent (at 414) from the IWS 310 to the mobile station 112 (with corresponding encapsulations and/or conversions through the MME 304 and node B 302).

Further procedures are then performed (at 416) to acquire a traffic channel at the 1xRTT radio interface, and to set up a bearer path in the 1xRTT domain with the mobile station 112.

Figure 5:
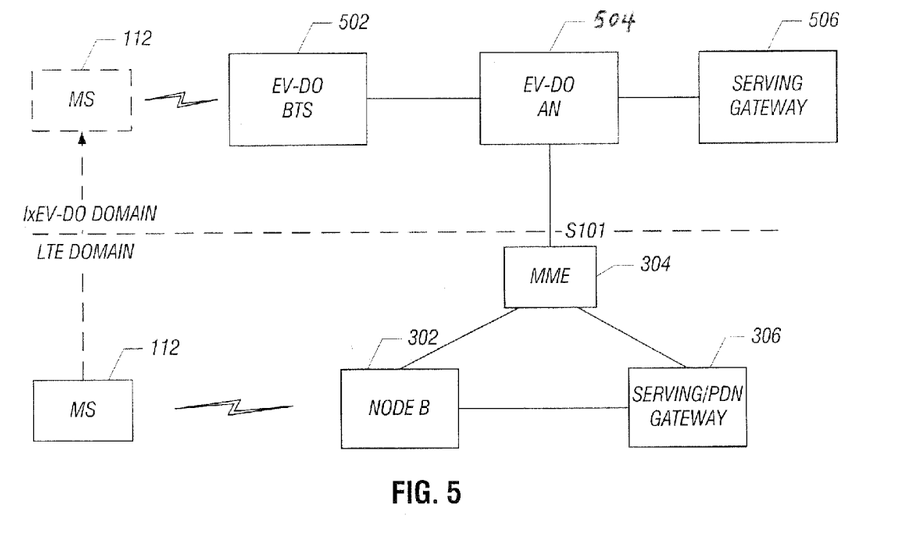
FIG. 5 is a block diagram of a communications network that includes nodes in a long term evolution (LTE) wireless network and an EV-DO wireless network, in which a handoff mechanism according to a preferred embodiment of the invention can be incorporated.

The handover of the mobile station 112 can also be performed from an LTE domain to an EV-DO domain, as depicted in the example of FIG. 5. In FIG. 5, the nodes that are the same as the nodes in FIG. 3 share the same reference numerals, including node B 302, MME 304, and serving/PDN gateway 306. Note that FIG. 5 is similar to FIG. 3, except that the 1xRTT nodes of FIG. 3 have been replaced with EV-DO nodes in FIG. 5.

The EV-DO domain includes an EV-DO BTS 502, an EV-DO access network 504, and a serving gateway 506. An interface referred to as S101 is provided between the MME 304 and the EV-DO access network 504.

Figure 6:
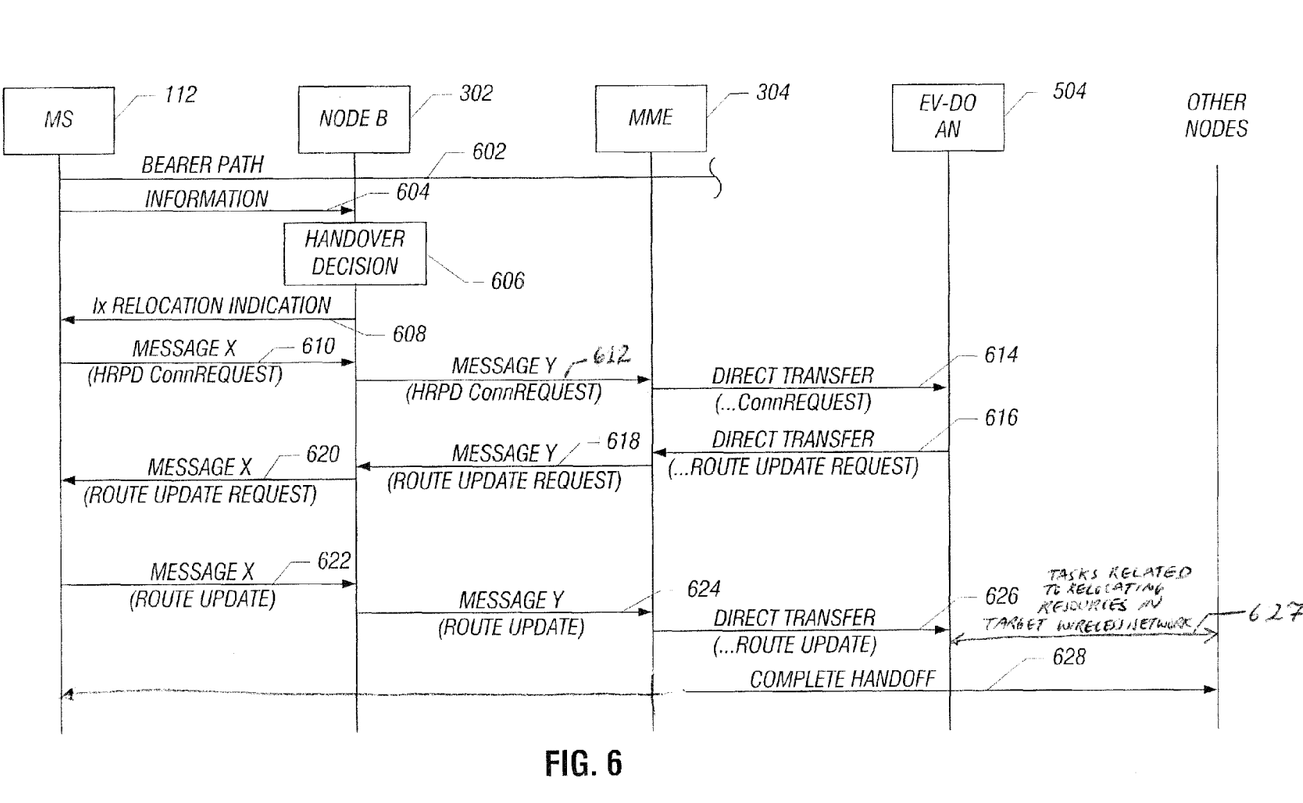
FIG. 6 is a message flow diagram of a handoff procedure from an LTE wireless network to an EV-DO wireless network, according to a preferred embodiment of the invention.

The handoff performed in the FIG. 5 context is similar to the handover in the FIG. 3 context. FIG. 6 shows a message flow diagram for performing a handoff between the LTE domain and the EV-DO domain. A bearer path (602) has been established between the mobile station 112 and another endpoint through the LTE domain.

In response to information (e.g., pilot measurements) received from the mobile station 112 (at 604), the node B makes a handoff decision (at 606), which involves handing off the mobile station 112 from the LTE domain to the EV-DO domain.

In response, the node B 302 sends (at 608) a 1xRTT relocation indication to the mobile station 112. In response, the mobile station 112 sends (at 610) an EV-DO (or HRPD) connection request (in message X) to the node B 302, which forwards (at 612) the EV-DO connection request in another message (message Y) to the MME 304. The MME 304 then sends a Direct Transfer message (at 614) to the EV-DO access network 504. The Direct Transfer message contains an S101 session identifier, the sector that the mobile station 112 is currently located in, and the HRPD connection request, among other information.

In accordance with some preferred embodiments, the EV-DO access network 504 can then request selective pilot measurements. The EV-DO access network does so by sending (at 616) a Direct Transfer message to the MME 304, where the Direct Transfer message contains the S101 session identifier as well as a Route Update Request. The Route Update Request contains information to identify pilots of respective cell segments for which the mobile station 112 is to perform pilot strength measurements. The information contained in the Route Update Request message corresponds to the information contained in the A21-Radio Update Request message discussed in connection with FIGS. 2 and 4.

In response to the Direct Transfer message received at 616, the MME 304 sends (at 618) a message (message Y) that contains the Route Update Request message to the node B 302. The node B 302 then sends (at 620) another message (message X) containing the Route Update Request message to the mobile station 112.

The mobile station 112 makes the pilot strength measurements requested by the message received 620, and responds (at 622) with a message (message X) that contains a Route Update Response, where the Route Update Response contains the pilot strength measurements taken by the mobile station 112. The node B 302 then sends (at 624) the message (message Y) containing the Route Update Response to the MME 304, which then sends (at 626) a Direct Transfer message to the EV-DO access network 504, where the Direct Transfer message sent at 626 contains the S101 session identifier and the Route Update Response that contains the pilot strength measurements. Various tasks and communications (627) are also occurring between the EV-DO access network 504 and other nodes in the EV-DO wireless network to allocate resources in the target wireless network to enable the handoff. Further messaging is then performed (at 628) to complete the handoff.

Figure 7:
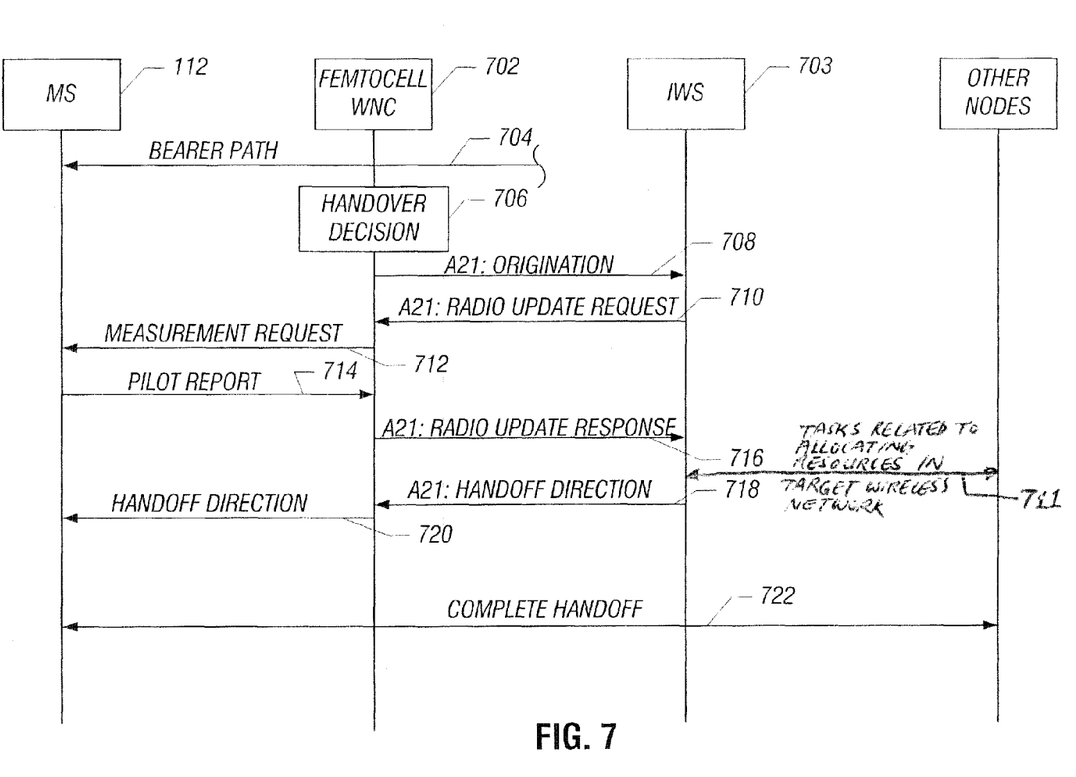
FIG. 7 is a message flow diagram of a handoff procedure from a femtocell wireless network to a 1xRTT wireless network, according to a preferred embodiment of the invention.

FIG. 7 shows a handoff between a femtocell wireless network controller 702 and a 1xRTT wireless network. As depicted in FIG. 7, a bearer path has initially been established (at 704) between the mobile station 112 and another endpoint through a femtocell wireless network controller 702. At some point, the mobile station 112 begins to move out of the coverage area of the femtocell wireless network controller 702, such as when the user leaves his or her home, or leaves an office location. When a handoff decision is made (at 706) by the femtocell wireless network controller 702, as a result of the mobile station beginning to move out of the coverage area, the femtocell wireless network controller 702 sends (at 708) an origination message through the A21 interface between the femtocell wireless network controller 702 and a 1xRTT IWS node 703.

Similar to the procedures described above, the IWS node 703 may decide to ask for specific pilot strength measurements of specified pilots in respective cell segments. To do so, the IWS node 703 sends an RF measurement request, such as in an A21-Radio Update Request message (similar to that of FIG. 2), which is sent (at 710) to the femtocell wireless network controller 702. The information in the A21-Radio Update Request message can be sent from the femtocell wireless network controller 702 to the mobile station 112 using one of several different types of messages, such as a Neighbor List Message, an Extended Neighbor List Message, a General Neighbor List Message, a Private Neighbor List Message, a Neighbor List Update Message, an Extended Neighbor List Update Message, or any other type of message defined by a standard for the corresponding wireless access technology.

Tasks and messaging with other nodes can also be occurring (at 711) to allocate resources in the target wireless network to perform the handoff.

Pilot reports (containing the pilot strength measurements) can be sent (at 714) back to the femtocell wireless network controller 702 using any one of various messages, including, as examples, a Pilot Strength Measurement Message, a Periodic Pilot Strength Measurement Message, and Extended Pilot Strength Measurement Message, a Pilot Strength Measurement Mini Message, and so forth.

The measurements are sent (at 716) from the femtocell wireless network controller 702 back to the IWS node 703 in an A21-Radio Update Response, and the IWS node 703 responds by sending a handoff direction message (at 718) to the femtocell wireless network controller 702. The handoff direction message is then sent (at 720) by the femtocell wireless network controller 702 to the mobile station 112. The procedure then continues (at 722) to complete the handoff from the femtocell wireless network to the 1xRTT wireless network.

Figure 8:
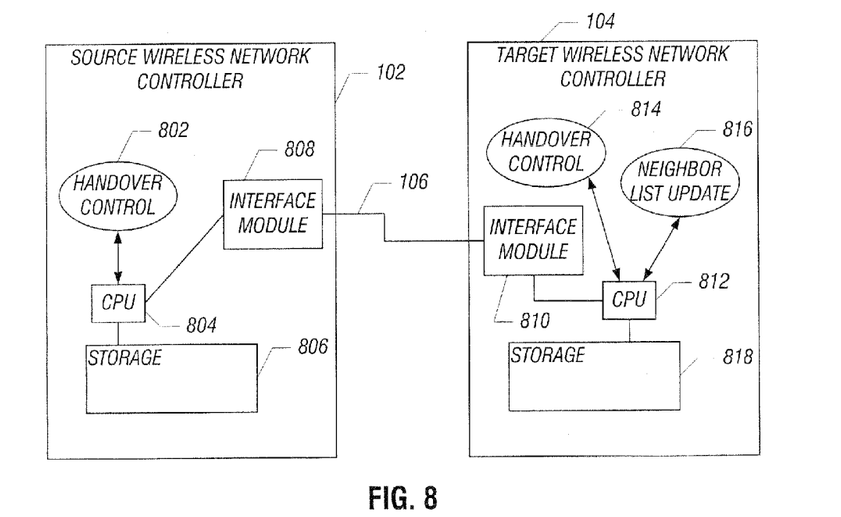
FIG. 8 is a block diagram of components of source and target wireless network controllers, according to a preferred embodiment of the invention.

FIG. 8 shows example components in the source wireless network controller 102 and target wireless network controller 104. As mentioned above, the source wireless network controller and target wireless network controller can be one of various different types of controller, depending on the wireless access technologies involved.

The source wireless network controller 102 includes a handover control module 802 (which can be implemented with software), that is executable on one or more central processing units (CPUs) 804. The CPU(s) is (are) connected to a storage 806 and to an interface module 808 to enable the source wireless network controller 102 to communicate over the link 106 to the target wireless network controller 104.

The target wireless network controller 104 also includes an interface module 810 that is connected to one or more CPUs 812 in the target wireless network controller 104. A handover control module 814 and a neighbor list update module 816 are executable on the one or more CPU(s) 812, which are connected to a storage 818. The handover control module 814 in the target wireless network controller 104 cooperates with the handover control module 802 in the source wireless network controller 102 to control the handover between the source and target wireless networks.

The neighbor list update module 816, according to preferred embodiments, determines which cell segments updated pilot measurements should be performed in, and produces a message that is sent to the source wireless network controller 102 to cause the mobile station that is to be handed over between the different wireless networks to perform pilot strength measurements of the specified pilots.

Instructions of software (such as the neighbor list update module 816, handover control module 814, and handover control module 802) are loaded for execution on a processor, such as the one or more CPUs 804 and 812. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing handoff of a mobile station from a source wireless network controller to a target wireless network controller, comprising:

the source wireless network controller determining a handover event for the mobile station from the source wireless network controller to the target wireless network controller;

in response to the handover event, the source wireless network controller transmitting a service redirection message to the mobile station;

after sending the service redirection message, the source wireless network controller receiving an origination message from the mobile station;

after receiving the origination message, sending a first message from the source wireless network controller to the target wireless network controller, the first message bring provided to initiate the handoff, wherein the source and target wireless network controllers communicate with the mobile station according to different protocols; and receiving, by the source wireless network controller from the target wireless network controller, a second message responsive to the first message, wherein the second message contains a request to perform signal strength measurements of selected cell segments neighboring the target wireless network controller, and wherein the second message contains information to enable identification of the selected cell segments neighboring the target wireless network controller for which signal strength measurements are to be performed.

2. The method of claim 1, wherein receiving the second message containing the information to enable identification of the selected cell segments comprises receiving the second message containing the information to enable the mobile station to locate signals of respective cell segments for measurement.

3. The method of claim 1, wherein receiving the second message containing the information to enable identification of the selected cell segments comprises receiving the second message containing the information to enable the mobile station to locate pilots of respective cell segments for measurement.

4. The method of claim 1, wherein handing off from the source wireless network controller to the target wireless network controller comprises handing off from an EV-DO wireless network controller to a 1xRTT wireless network controller.

5. The method of claim 1, wherein handing off from the source wireless network controller to the target wireless network controller comprises handing off from a femtocell wireless network controller to another type of wireless network controller.

6. The method of claim 1, further comprising:

sending another message to the mobile station containing information to enable the mobile station to identify the selected cell segments neighboring the target wireless network controller to enable the mobile station to perform the signal strength measurements, wherein sending the another message responsive to the second message enables updated signal strength measurements.

7. The method of claim 1, further comprising receiving signal strength measurements made by the mobile station in response to the information contained in the second message.

8. The method of claim 1, wherein receiving the second message comprises receiving an A21-Radio Update Request message.

9. The method of claim 8, wherein receiving the A21-Radio Update Request message comprises receiving the A21-Radio Update Request message that contains a Pilot List information element including the information to enable identification of the selected cell segments neighboring the target wireless network controller for which pilot strength measurements are to be performed.

10. The method of claim 9, wherein the Pilot List information element further includes a field to indicate a number of pilots that are identified in the Pilot List information element.

11. The method of claim 10, wherein the Pilot List information element further includes a timing offset for each pilot to enable the mobile station to locate the respective pilot the mobile station is to measure.

12. The method of claim 1, wherein sending the first message comprises sending the first message that contains an origination request sent by the mobile station for initiating the handoff.

13. The method of claim 1, wherein receiving the second message containing the information to enable identification of the selected cell segments comprises receiving the second message containing the information that enables identification of cell segments selected by the target wireless network controller.

14. A source wireless network controller comprising:
an interface module to communicate with a target wireless network controller; and
a processor to:
determine a handover event for the mobile station from the source wireless network controller to the target wireless network controller;
in response to the handover event, transmit a service redirection message to the mobile station;
after sending the service redirection message, receive an origination message from the mobile station;
after receiving the origination message, send a first message to the target wireless network controller to initiate handoff of a mobile station from the source wireless network controller to the target wireless network controller; and
receive a second message from the target wireless network controller that contains a request to perform control signal strength measurements of selected cell segments neighboring the target wireless network controller and information to enable identification of the selected cell segments neighboring the target wireless network controller for which control signal strength measurements are to be made, wherein the selected cell segments are based on selection made by the target wireless network controller.

15. The source wireless network of claim 14, wherein the second message comprises an A21 message.

* * * * *

UNITED STATES PATENT AND TRADEMARK OFFICE
CERTIFICATE OF CORRECTION

PATENT NO. : 8,577,370 B1
APPLICATION NO. : 12/028511
DATED : November 5, 2013
INVENTOR(S) : Karl D. Mann et al.

Page 1 of 1

It is certified that error appears in the above-identified patent and that said Letters Patent is hereby corrected as shown below:

In the Claims:

Claim 1, Column 12, Line 1, please delete "bring" and substitute -- being --

Signed and Sealed this
Twenty-eighth Day of January, 2014

Michelle K. Lee
*Deputy Director of the United States Patent and Trademark Office*